United States Patent [19]

Leuschner et al.

[11] 4,206,341
[45] Jun. 3, 1980

[54] ADJUSTABLE TEMPERATURE WARMING PLATE FOR ELECTRIC COFFEE MAKER

[75] Inventors: Udo Leuschner; Günther Traunspurger; Alfons Zinsberger, all of Traunreut, Fed. Rep. of Germany

[73] Assignee: Bosch-Siemens Hausgeräte GmbH, Stuttgart, Fed. Rep. of Germany

[21] Appl. No.: 817,240

[22] Filed: Jul. 20, 1977

[30] Foreign Application Priority Data

Jul. 30, 1976 [DE] Fed. Rep. of Germany ....... 2634390

[51] Int. Cl.² .................. H05B 3/68; F24H 1/10; A47J 31/44
[52] U.S. Cl. .................................... 219/283; 99/288; 165/96; 219/301; 219/418; 219/434; 219/459; 219/462; 219/530; 219/536
[58] Field of Search .............. 219/200, 201, 218, 254, 219/255, 258, 280, 281, 283, 296–299, 301–305, 311, 399, 429–435, 443–468, 530, 536, 415–419; 99/279–282, 288, 304–306; 165/96

[56] References Cited

U.S. PATENT DOCUMENTS

| | | | |
|---|---|---|---|
| 1,102,392 | 7/1914 | Denhard | 219/456 |
| 1,649,506 | 11/1927 | Brewer | 219/530 UX |
| 2,025,252 | 12/1935 | Stencell | 219/418 |
| 2,560,214 | 7/1951 | Cameron | 99/288 |
| 2,678,992 | 5/1954 | Koch | 219/434 |
| 2,758,821 | 8/1956 | Pruehs | 165/96 X |
| 3,953,923 | 5/1976 | Rygmyr | 219/302 X |

FOREIGN PATENT DOCUMENTS 2234661 1/1974 Fed. Rep. of Germany ........... 219/302

Primary Examiner—A. Bartis
Attorney, Agent, or Firm—Herbert L. Lerner

[57] ABSTRACT

An adjustable temperature warming plate for an electric coffee maker in which a fixedly positioned metal hot plate has an electric heating element disposed beneath and adjacent the hot plate with the supporting means for the electric heating element permitting the heating element to pivot about a contact point near the edge of the hot plate for varying the thermal coupling of the heating element to the hot plate by changing the spacing between the heating element and the hot plate. A pressure element is provided to urge the heater toward the contact point and a setting element is provided to adjust the spacing between the heating element and the hot plate. This provides a simple and reliable means for varying the thermal coupling of the heating element to the hot plate and consequently the temperature of the warming plate. The heating element includes a tube unitary therewith forming a continuous flow water heating tube for the coffee maker.

21 Claims, 9 Drawing Figures

ADJUSTABLE TEMPERATURE WARMING PLATE FOR ELECTRIC COFFEE MAKER

FIELD OF THE INVENTION

This invention relates to a warming plate of an electric coffee maker in which the thermal coupling of the heating element to the hot plate is variable.

BACKGROUND OF THE INVENTION

Warming plates of coffee makers using an electrical heating element are known. They do have several drawbacks with respect to mechanical stress, cost of assembly and simplicity, particularly with respect to varying the hot-keeping function. German Published Prosecuted Application 2 108 541 illustrates a known coffee machine.

SUMMARY OF THE INVENTION

An object of the present invention is to provide a warming plate of an electric coffee maker which is simple in structure and operationally reliable.

A further object of the invention is to provide a warming plate of an electric coffee maker with a setting device for the temperature of the hot plate, which subjects the material of the heating element to a minimum of mechanical stress.

Another object of the invention is to provide a warming plate of an electric coffee maker in which the hot plate together with the heater and the setting means can be preassembled as an assembly structure.

With the foregoing and other objects in view, there is provided in accordance with the invention, a warming plate of an electric coffee maker having a housing, a topside opening in the housing, a fixedly mounted metal hot plate on which a coffee pot may be set closing off the topside opening, an electric heating element disposed beneath and adjacent the hot plate, supporting means for the electric heating element permitting the heating element to pivot about a contact point near the edge of the hot plate for varying the thermal coupling of the heating element to the hot plate by changing the spacing between the heating element and the hot plate.

The warming plate includes a pressure element urging the heating element in the vicinity of the contact point in the direction toward the contact point. The pressure element acts on the heating element directly under the contact point. A setting element engages the heating element at a point away from the contact point and adjusts the spacing between the heating element and the hot plate at that point away from the contact point. A return spring urges the heating element toward the hot plate against the force of the setting element increasing the spacing between the heating element and the hot plate. The pressure element may be shifted from the contact point to also serve as the return spring. The setting element and the return spring engaging the heating element desirably are disposed closely together. The return spring has one of its ends attached at the setting element. The return spring has its other end attached at the heating element. The pressure element is supported by the hot plate. The setting element and the return spring are supported by the hot plate. The contact point is linear and is defined by a contact edge of the hot plate. The contact edge of the hot plate is formed by a bend of the hot plate. The contact point is linear and is defined by a contact edge of the heating element. The contact edge of the heating element is defined by a bend of the heating element. The heating element is a tubular heater bent in the form of a horseshoe and the contact edge is defined by the two ends of the horseshoe.

In accordance with the invention there is provided a warming plate of an electric coffee maker having a housing, a topside opening in the housing, a metal hot plate on which a coffee pot may be set closing off the topside opening, an electric heating element disposed beneath and adjacent the hot plate, an assembly composed of the hot plate and electric heating element with pressure means supported by the hot plate pushing the electric heating element against the hot plate, and with setting means engaging the heating element to adjust the distance of the heating element from the hot plate.

The hot plate has ears extending downward from the hot plate, and the ears support the pressure means and the setting means. The hot plate is a sheet metal plate with edge zones bent downward to form the ears. The heating element is supported hinged about a contact point in the edge zone of the hot plate.

Other features which are considered as characteristic for the invention are set forth in the appended claims.

Although the invention is illustrated and described herein as embodied in a warming plate of an electric coffee maker, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
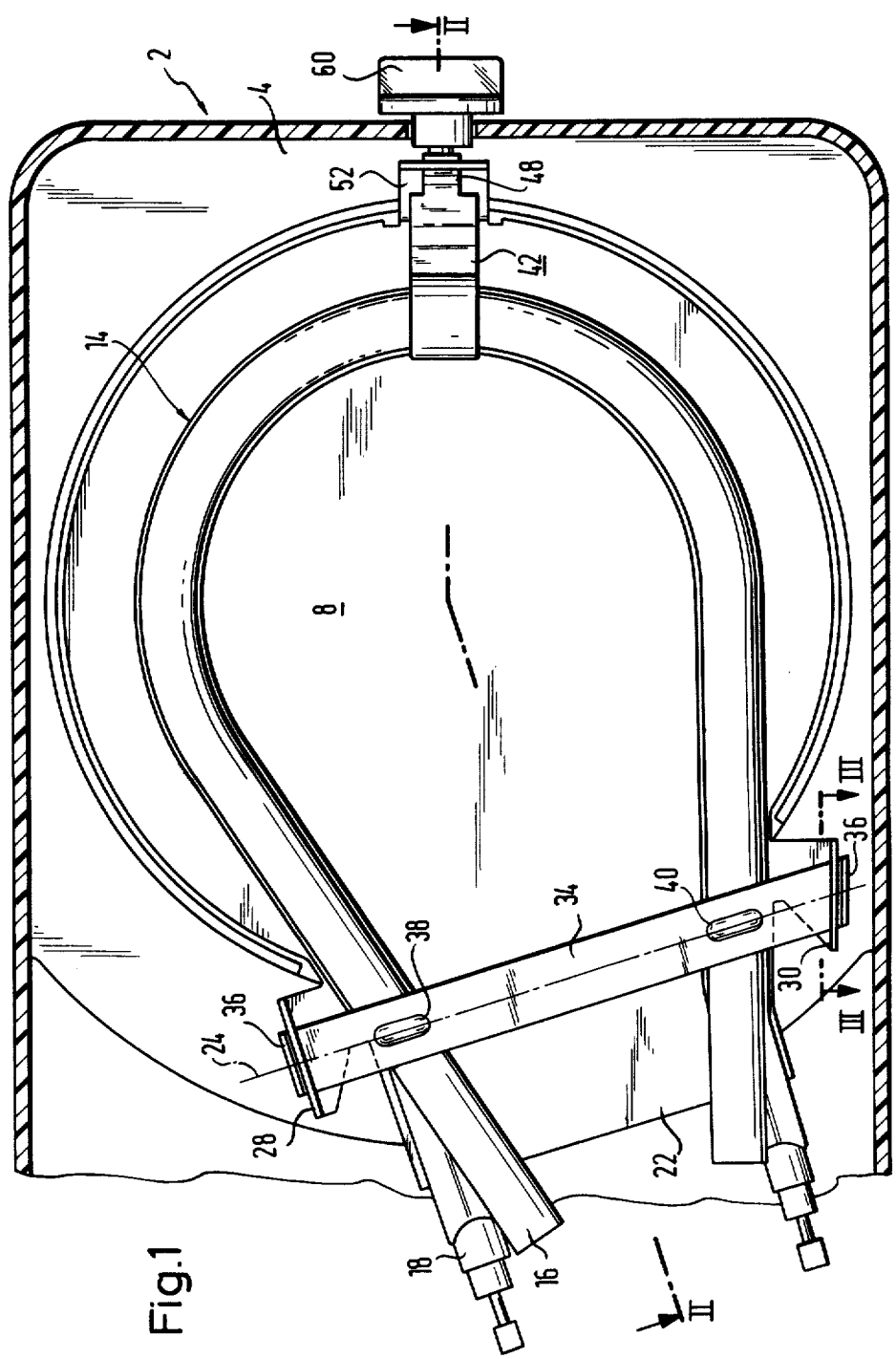
FIG. 1 shows a bottom view of a warming plate with the bottom removed of an electric coffee maker in accordance with the invention.

The hot plate has near its rim a bend or a substantially straight edge, about which the heating element is hinged in order to adjust to a larger or smaller air gap between the heating element and the hot plate. The heating element is preferably pre-tensioned by means of at least one pressure spring in the area of the bend or the edge in the direction toward the latter. It is further advantageous to provide a setting element, preferably in the form of a cam acting against the force of a return spring, which cooperates with the hot plate and the heating element away from the bend or the edge and sets the distance, i.e. the spacing, between the heating element and the hot plate.

The pressure spring may be shifted relative to the bend or the edge and serve as the return spring. The pressure spring and preferably also the setting element are advantageously supported at the hot plate. Thereby, the hot plate, the heating element, the spring or springs and the setting device are combined in an assembly which can be inserted as a whole into the base of a coffee maker.

The heating element rests against the hot plate at least at one point or along a contact line and is pressed against the hot plate by pressure means engaging it in the vicinity of the contact point or the contact line. In this manner the heating element is pressed firmly against the hot plate with but little stress in bending or flexure, as the pressure forces of the pressure spring are directed near the contact point or the contact line. Low bending stress is important, particularly in heating elements in the form of tubular aluminum heaters or continuous-flow heaters of aluminum, as this material has a tendency to be deformed by creeping, at the temperatures that occur and the stresses prevailing over extended periods of time, i.e. a slow yielding process. The pressure means are preferably arranged substantially directly under the contact point or the contact line and their force is directed directly against the contact point or the contact line.

Referring to the drawings, electric coffee maker 2, of which segments are shown in FIGS. 1 to 4, has in a housing base 4 a topside opening 6, in which a hot plate 8 of sheet steel serving to set down a coffee pot, not shown, is fastened by means of screws, not shown, and rests against an elastic sealing ring 10 which surrounds the opening 6 of the housing. The housing base 4 is closed off by a bottom 12. Underneath the hot plate is arranged a continuous-flow heater 14 in the form of a one-piece, extruded double tube with a water pipe 16, a tubular heater 18 and a cross piece 20 connecting them.

To one side of the housing opening 6, the hot plate 8 has an extension 22, which is angled-off slightly upward along a bend 26 indicated in FIG. 1 by the dash-dotted line 24. The hot plate has ears 28 and 30, laterally to the bend 26, which ears are bent downward at right angles. The continuous-flow heater 14 has the form of an approximately U-shaped loop, the legs of which extend over the bend 24, 26 of the hot plate 8 and the extension 22 of the latter.

The ears 28 and 30 of the hot plate 8 have cutouts 32 open toward the ends of the continuous-flow heater 14 (FIG. 3) with barbs 33, into which is inserted a pressure spring 34, which extends directly under the bend 26 and serves as the pressure element, in the form of a spring bracket having end sections 36 bent-off downward.

The pressure spring 34 presses with two rounded bumps 38 and 50 on the end sections or legs of the continuous-flow heater 14. The rounded bumps 38 and 40 let the continuous-flow heater 14 slide easily when it is tilted about the bend 26. In the region in the middle of the continuous-flow heater 14 away from the bend 26, a return spring 42 in the form of a spring bracket is anchored to the heater by tightly surrounding the water pipe 16. An end section 44 of return spring 42 extends through an opening 46 in the cross piece 20 and is supported by being placed against the tubular heater 18. A free end 48 of the return spring 42 is hooked into an opening 50 of a downward-bent ear 52 of the hot plate 8. Above the opening 50, a bearing sleeve 54 is riveted into a further opening of the ear 52. A shaft 56 of a cam 58 is supported in the bearing sleeve 54. The cam 58 cooperates with the middle region of the return spring 42. The shaft 56 is secured against shifting by locking washers. A control handle 60 which extends to the outside of the housing between the housing base 4 and the bottom 2 is placed on the free end of shaft 56.

Figure 4:
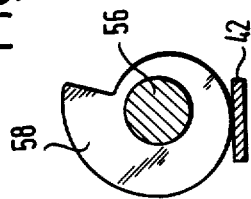
FIG. 4 is a section taken along the line IV—IV in FIG. 2 to show the shaft and cam of the setting element.

As may be seen particularly from FIG. 4, the cam 58 when rotated, cooperates with the return spring 42 and pushes the continuous-flow heater 14 away from the hot plate 8 against the force of the return spring 42. As the cam 58 is rotated, the continuous-flow heater 14 is tilted about the bend 26, against which it is pressed by the pressure spring 34. The displaced position of parts 16 and 18 are shown by the dash-dash lines in FIG. 2. As a control, not shown, keeps the temperature of the continuous-flow heater substantially constant, less heat is then supplied to the hot plate 8.

Figure 2:
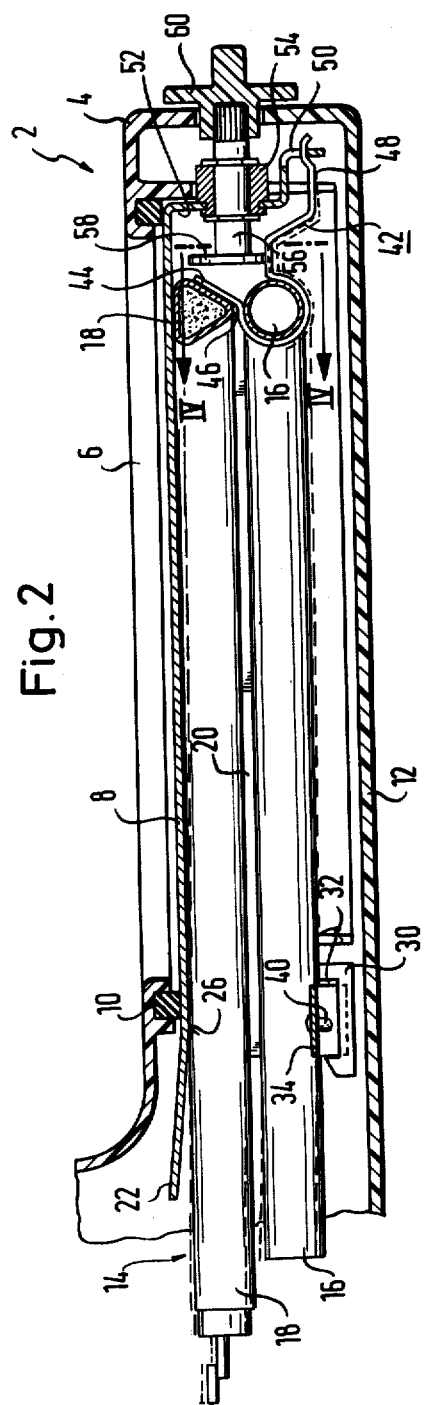
FIG. 2 is a section of the warming plate taken along the line II—II in FIG. 1.
Figure 3:
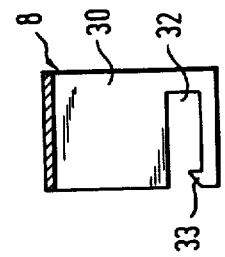
FIG. 3 is a section taken along the line III—III in FIG. 1, to show the ear extending from the hot plate with the compression spring left off.

If the pressure spring 34 is arranged not directly under the bend, but shifted to the right in FIG. 2, then the pressure spring 34 has the tendency to urge the continuous-flow heater 14 in contact with the hot plate. A separate return spring such as the spring 42 can then be omitted and the cam 58 can cooperate with a clamp which is fastened tightly only to the continuous-flow heater 14.

Figure 5:
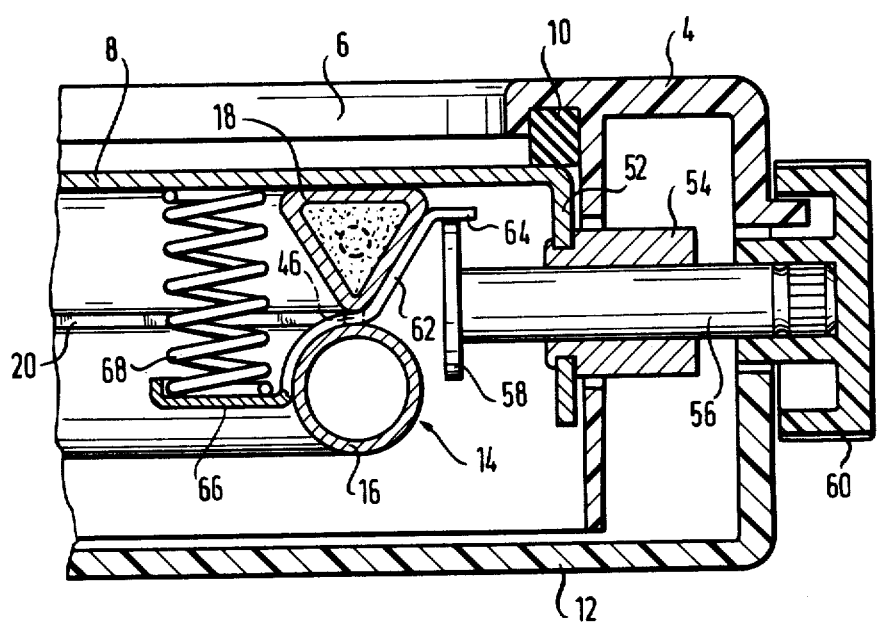
FIG. 5 is a section similar to that of FIG. 2 of a modified embodiment, on an enlarged scale.
Figure 5A:
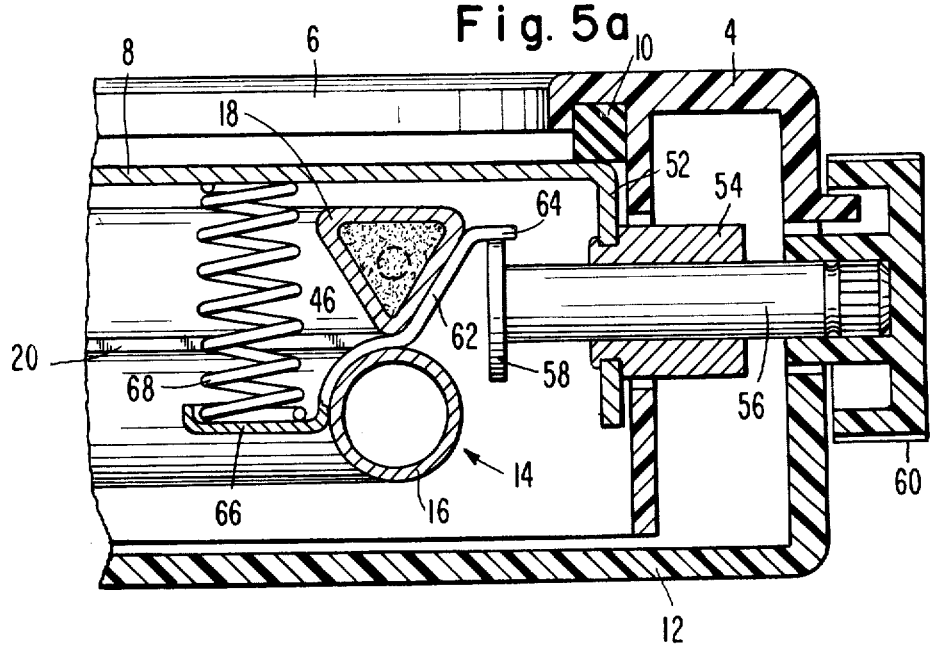
FIG. 5a is a view similar to FIG. 5 showing the heater 18 adjusted to a position spaced from plate 8.

In the modified embodiment shown in FIG. 5, in which identical parts are designated with the same reference numerals as in FIGS. 1 to 4, a hook 62 extends through the opening 46 in the cross piece 20 of the continuous-flow heater 14 and is braced on the side facing the cam 58 against the tubular heater 18. Hook 62 has an overhanging free section 64 which cooperates with the cam 58, while its other end rests on the water pipe 16 and has an overhanging free section formed into a cup 66. A coil compression spring 68 is clamped between the cup 66 and the hot plate 8 and pushes the continuous-flow heater 14 away from the hot plate 8 as far as the cam 58 permits. This spring too can be omitted if the pressure spring 34 (FIGS. 1 and 2) is shifted away from the bend 26 toward the right in a suitable manner. In FIG. 5a the coil compression spring 68 pushes heater 18 away from the hot plate 8 to the extent permitted by cam 58.

In the two embodiments shown, the hot plate 8 is connected by means of its three ears 28, 30 and 52 to the continuous-flow heater 14, the springs and the adjusting mechanism to form an assembly which is fastened in the housing, making contact against the seal 10. Kinematically reversing the embodiments described, however, a flat, i.e. unbent hot plate 8 can be used and a continuous-flow heater 14, in which the water pipe 16 and the tubular heater 18 lie side by side, can be bent along the line 24 in FIG. 1 and held in place by a pressure spring.

If a continuous-flow heater of aluminum tubing and, in particular, of an extruded profile is used, the pressure spring 34 pushes advantageously directly under the bend 26 and in the direction toward the bend, onto the continuous-flow heater pipe 14, so that the latter is not set under tension. This is necessary, as the usual aluminum alloys have a tendency to get deformed by flowing or creeping at the temperatures occurring in the keeping-warm operation, and would warp the continuous-flow heater loop in operation with continuous tension, and accurate setting would no longer be possible.

In one embodiment example, the pressure spring 34 pushes the continuous-flow heater loop 14 with a force of 2 to 3 kg directly onto the bend 26. The spring 42 cooperating with the cam 58 presses with a force of about 4 kg against the cam 58 or presses the continuous-flow heater 14 against the hot plate 8 if the cam 58 is turned so as to be not in engagement with the spring 42.

Figure 6:
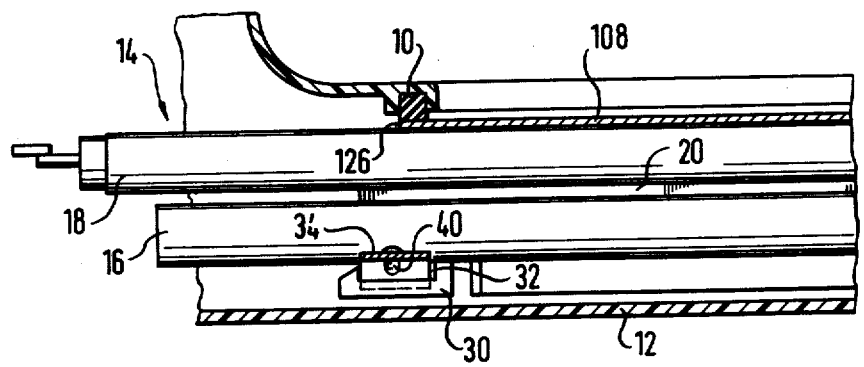
FIG. 6 is a section similar to that of FIG. 2 of a further, modified embodiment.

The embodiment shown in FIG. 6 is modified from that shown in FIG. 2 to the extent that the bend 26 of the hot plate 8 is replaced by a lateral end edge 126 of a hot plate 108, and the bent-off section of the hot plate as per FIGS. 1 and 2 is omitted. The continuous-flow heater 14 corresponds to that of the embodiment according to FIGS. 1 and 2 without change.

Figure 7:
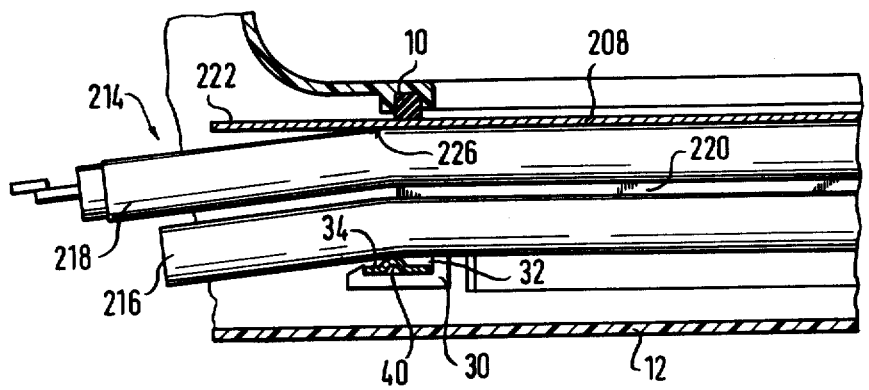
FIG. 7 is a section corresponding to that of FIG. 2 of still another modified embodiment.

In the modified embodiment shown in FIG. 7, a hot plate 208 completely flat in the region of a contact line 226 of a continuous-flow heater 214, with an extension 222 extending in the same plane as the rest of the hot plate, is used. In order to effect the tilting motion, the continuous-flow heater 214 is bent down with its ends along the contact line 226 as shown in FIG. 7. The cross piece 220, connecting a tubular heater 218 and a water pipe 216, of the continuous-flow heater 214 made of an extruded profile, does not extend from beyond the bend to the ends. This keeps the deformations occurring in the individual tubes during the bending small.

Figure 8:
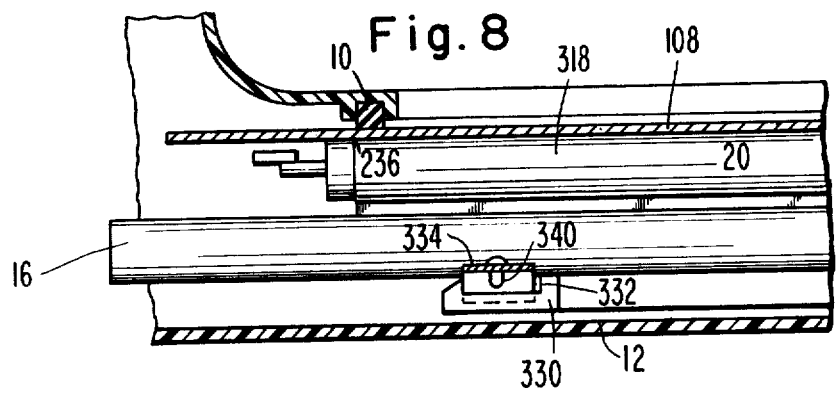
FIG. 8 is a section similar to that shown in FIG. 6, of another embodiment to illustrate the pressure element shifted from the contact point and also the contact edge at the ends of the tubular heater.

The embodiment in FIG. 8 is modified from that shown in FIG. 2 and FIG. 6 in that tubular heater 318 is shortened and the contact edge 326 is at the ends of tubular heater 318 which is in the form of a horseshoe as shown in FIG. 1. In FIGS. 2 and 6, the pressure element is disposed directly under the contact point, whereas in FIG. 8, the pressure element composed of ear 330, cutout 332 in ear 330, pressure spring 334 and bump 340, are shifted from the contact point to also serve as the return spring.

In the embodiment examples described above, continuous-flow heaters were shown with the tubular heater and the water pipe lying on top of each other, but continuous-flow heaters with tubes arranged side by side may also be used.

There are claimed:

1. In a warming plate of an electric coffee maker having a housing, a topside opening in the housing, a fixedly positioned metal hot plate on which a coffee pot may be set closing off the topside opening, an electric heating element disposed beneath and adjacent the hot plate in heat exchange relationship therewith, the combination therewith of supporting means secured to said fixedly positioned metal hot plate for mounting the electric heating element for pivotal movement toward and away from said plate about a point of contact between the heating element and hot plate near an edge of the hot plate for varying the thermal coupling of the heating element to the hot plate by changing the spacing between the heating element and the hot plate at a point away from the contact point, a pressure element urging the heating element in the vicinity of the point of contact in the direction bringing said element into contact with said plate, said supporting means including means for selectively adjusting the pivoted position of the heating element relative to the plate.

2. Warming plate according to claim 1, wherein the pressure element acts on the heating element directly under the contact point.

3. Warming plate according to claim 1, wherein said means for selectively adjusting the pivoted position of said heating element includes a setting element which engages the heating element at a point away from the contact point and adjusts the spacing between the heating element and the hot plate at that point away from the contact point.

4. Warming plate according to claim 3, including a return spring urging the heating element toward the hot plate against the force of the setting element increasing the spacing between the heating element and the hot plate.

5. Warming plate according to claim 4, wherein the setting element and the return spring engaging the heating element are disposed closely together.

6. Warming plate according to claim 5, wherein the return spring has one of its ends attached at the setting element.

7. Warming plate according to claim 6, wherein the return spring has its other end attached at the heating element.

8. Warming plate according to claim 1, wherein said pressure element is shifted from the contact point to also serve as the return spring.

9. Warming plate according to claim 1, wherein the pressure element is supported by the hot plate.

10. Warming plate according to claim 9, wherein the setting element and the return spring are supported by the hot plate.

11. Warming plate according to claim 1, wherein the contact point is linear and is defined by a contact edge of the hot plate.

12. Warming plate according to claim 11, wherein the contact edge of the hot plate is formed by a bend of the hot plate.

13. Warming plate according to claim 1, wherein the contact point is linear and is defined by a contact edge of the heating element.

14. Warming plate according to claim 13, wherein the contact edge of the heating element is defined by a bend of the heating element.

15. Warming plate according to claim 14, wherein the heating element is a tubular heater bent in the form of a horseshoe and the contact edge is defined by the two ends of the horseshoe.

16. Hot plate according to claim 1, wherein the heating element includes a tube unitary therewith, and forming a continuous flow water heater for the coffee maker and with the tube having a water inlet and a water outlet.

17. In a warming plate of an electric coffee maker having a housing, a topside opening in the housing, a fixedly positioned metal hot plate on which a coffee pot may be set closing off the topside opening, an electric heating element disposed beneath and adjacent the hot plate in heat exchange relationship therewith, the improvement wherein said hot plate and heating element comprise a unitary assembly and said hot plate includes supporting means for mounting the heating element for pivotal movement toward and away from the hot plate about a point of contact between the hot plate and heating element near an edge of the hot plate for varying the thermal coupling of the heating element to the hot plate by changing the spacing between the heating element and the hot plate at a point away from the pivotal point, pressure means supported by support means secured to the fixedly positioned hot plate for pushing the electric heating element against the hot plate in the vicinity of said point of pivotal contact, said supporting means including setting means engaging the heating element at a point away from said contact point for adjusting the spacing of the heating element from the hot plate at a point away from said contact point for varying the thermal coupling of the heating element to the hot plate.

18. Warming plate according to claim 17, wherein the hot plate has ears extending downward from the hot plate, and wherein said ears support said pressure means and said setting means.

19. Hot plate according to claim 18, wherein the hot plate is a sheet metal plate with edge zones bent downward to form said ears.

20. Hot plate according to claim 17, wherein the heating element is supported hinged about a contact point in the edge zone of the hot plate for movement toward and away from said hot plate.

21. Hot plate according to claim 17, wherein the heating element includes a tube unitary therewith, and forming a continuous flow water heater for the coffee maker and with the tube having a water inlet and a water outlet.

* * * * *